US012802552B2

(12) United States Patent
(10) Patent No.: US 12,802,552 B2
(45) Date of Patent: Nov. 17, 2026

Matsumoto et al.

(54) VEHICLE AND ITEM-LEFT-BEHIND PREVENTION SYSTEM FOR VEHICLE

(71) Applicant: SUBARU CORPORATION, Tokyo (JP)

(72) Inventors: Koki Matsumoto, Tokyo (JP); Tatsuya Suto, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 19/087,682

(22) Filed: Mar. 24, 2025

(65) Prior Publication Data

US 2025/0329247 A1 Oct. 23, 2025

(30) Foreign Application Priority Data

Apr. 18, 2024 (JP) ................................ 2024-067844

(51) Int. Cl.

| | |
|---|---|
| ***G08B 21/24*** | (2006.01) |
| ***B60W 50/14*** | (2020.01) |
| ***G06V 20/59*** | (2022.01) |
| ***H04W 4/029*** | (2018.01) |
| ***H04W 4/40*** | (2018.01) |

(52) U.S. Cl.

CPC ............. *G08B 21/24* (2013.01); *B60W 50/14* (2013.01); *G06V 20/59* (2022.01); *H04W 4/029* (2018.02); *H04W 4/40* (2018.02); *B60W 2050/143* (2013.01); *B60W 2420/403* (2013.01); *B60W 2556/50* (2020.02)

(58) Field of Classification Search

CPC ..... B60W 2050/143; B60W 2420/403; B60W 2556/50; B60W 50/14; G06V 20/59; G08B 21/24; H04W 4/029; H04W 4/40

See application file for complete search history.

(56) References Cited

U.S. PATENT DOCUMENTS

2012/0232749 A1* 9/2012 Schoenberg ......... B60N 2/0022 340/457
2019/0251376 A1* 8/2019 Stoffel ..................... B60Q 3/76
2021/0209927 A1* 7/2021 Hedges ................ G08B 25/005

FOREIGN PATENT DOCUMENTS

JP 2005-115911 A 4/2005

* cited by examiner

*Primary Examiner* — Omer S Khan
(74) *Attorney, Agent, or Firm* — Rimon P.C.

(57) ABSTRACT

A vehicle includes: a camera imaging the inside of the vehicle, a first data acquirer acquiring position data of the vehicle; a second data acquirer acquiring door lock data; a calculator calculating a movement of the vehicle in a period from a departure from a home position to an arrival at the home position, based on the position data; a determiner determining whether any item is inadvertently left inside the vehicle, based on a first image captured by the camera in a situation where the vehicle is at the home position and the door is locked, and a second image captured by the camera in a situation where the vehicle is at the home position, the door is locked, and the movement is greater than a predetermined threshold; and a controller causing the presence of an item left inside the vehicle to be presented to an occupant of the vehicle.

12 Claims, 4 Drawing Sheets

VEHICLE AND ITEM-LEFT-BEHIND PREVENTION SYSTEM FOR VEHICLE

CROSS-REFERENCE TO RELATED APPLICATIONS

The present application claims priority from Japanese Patent Application No. 2024-067844 filed on Apr. 18, 2024, the entire contents of which are hereby incorporated by reference.

BACKGROUND

The disclosure relates to a vehicle and an item-left-behind prevention system for a vehicle.

In recent years, techniques have been put to practical use that detect an item inadvertently left inside a vehicle and notify an occupant of the vehicle of the presence of such an item.

As one example of these techniques described above, Japanese Unexamined Patent Application Publication No. 2005-115911, for example, discloses a device that detects whether any item is inadvertently left inside a vehicle compartment by comparing an image of the inside of the vehicle compartment captured upon current locking of a door of the vehicle with an image inside the vehicle compartment captured upon previous locking of the door. When detecting the item inadvertently left inside the vehicle compartment, the device notifies an occupant of the vehicle of the presence of the item.

SUMMARY

An aspect of the disclosure provides a vehicle including a camera, a first data acquirer, a second data acquirer, a calculator, a determiner, and a controller. The camera is configured to capture an image of an inside of a vehicle compartment of the vehicle. The first data acquirer is configured to acquire position data of the vehicle by receiving electric waves emitted from a satellite positioning system. The second data acquirer is configured to acquire door lock data as to whether a door of the vehicle is locked. The calculator is configured to calculate a movement of the vehicle in a period from a departure from a home position of the vehicle to an arrival at the home position, based on the position data. The determiner is configured to make a determination as to whether any item is inadvertently left inside the vehicle compartment, based on: a first image captured by the camera in a situation where the vehicle is determined to be located at the home position, based on the position data, and where the door is determined to be locked, based on the door lock data; and a second image captured by the camera in a situation where the vehicle is determined to be located at the home position, based on the position data, where the door is determined to be locked, based on the door lock data, and where the movement is determined to be greater than a predetermined threshold. The controller is configured to, when the determiner determines that an item is inadvertently left inside the vehicle compartment, cause notification information indicating that the item is inadvertently left inside the vehicle compartment to be presented to an occupant of the vehicle.

An aspect of the disclosure provides an item-left-behind prevention system configured to be applied to a vehicle. The item-left-behind prevention system includes a camera and a processing apparatus. The camera is configured to capture an image of an inside of a vehicle compartment of the vehicle. The processing apparatus includes one or more processors, and one or more memories communicably coupled to the one or more processors. The one or more processors are configured to acquire position data of the vehicle by receiving electric waves emitted from a satellite positioning system, acquire door lock data as to whether a door of the vehicle is locked, calculate a movement of the vehicle in a period from a departure from a home position of the vehicle to an arrival at the home position, based on the position data, determine whether any item is inadvertently left inside the vehicle compartment, based on: a first image captured by the camera in a situation where the vehicle is determined to be located at the home position, based on the position data, and where the door is determined to be locked, based on the door lock data; and a second image captured by the camera in a situation where the vehicle is determined to be located at the home position, based on the position data, where the door is determined to be locked, based on the door lock data, and where the movement is determined to be greater than a predetermined threshold, and when determining that an item is inadvertently left inside the vehicle compartment, cause notification information indicating that the item is inadvertently left inside the vehicle compartment to be presented to an occupant of the vehicle.

An aspect of the disclosure provides a vehicle including a camera and circuitry. The camera is configured to capture an image of an inside of a vehicle compartment of the vehicle. The circuitry is configured to: acquire position data of the vehicle by receiving electric waves emitted from a satellite positioning system; acquire door lock data as to whether a door of the vehicle is locked; calculate a movement of the vehicle in a period from a departure from a home position of the vehicle to an arrival at the home position, based on the position data; determine whether any item is inadvertently left inside the vehicle compartment, based on a first image captured by the camera in a situation where the vehicle is determined to be located at the home position, based on the position data and where the door is determined to be locked, based on the door lock data, and a second image captured by the camera in a situation where the vehicle is determined to be located at the home position, based on the position data, where the door is determined to be locked, based on the door lock data, and where the movement is determined to be greater than a predetermined threshold; and when determining that an item is inadvertently left inside the vehicle compartment, cause notification information indicating that the item is inadvertently left inside the vehicle compartment to be presented to an occupant of the vehicle.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
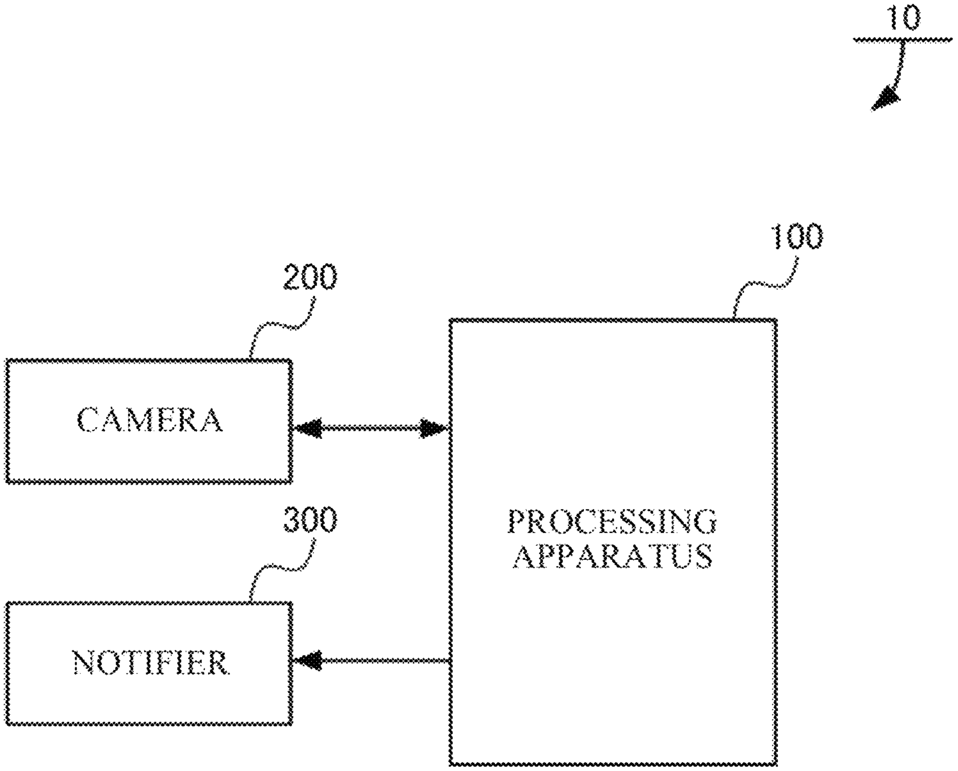
FIG. 1 is a block diagram illustrating a configuration example of a vehicle according to one example embodiment of the disclosure.

If an occupant of a vehicle repeatedly locks/unlocks a door of the vehicle when loading baggage from home into the vehicle before a departure on a trip, for example, the baggage intentionally left inside the vehicle can be erroneously detected as being inadvertently left inside the vehicle.

It is desirable to provide a vehicle and an item-left-behind prevention system for a vehicle that prevents an item from being inadvertently left inside the vehicle by detecting whether any item is inadvertently left inside the vehicle with high accuracy.

EXAMPLE EMBODIMENTS

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

A vehicle 10 according to an example embodiment of the disclosure will now be described with reference to FIGS. 1 to 4.

Configuration Example of Vehicle 10

As illustrated in FIG. 1, the vehicle 10 according to the present example embodiment may include a processing apparatus 100, a camera 200, and a notifier 300.

Note that a configuration example of the processing apparatus 100 will be described in detail later.

The camera 200 may capture an image of the inside of a vehicle compartment of the vehicle 10.

In the present example embodiment, the camera 200 may start capturing an image inside the vehicle compartment of the vehicle 10 when receiving an imaging start request from the processing apparatus 100, for example (e.g., upon the power of the camera 200 being turned on).

In the present example embodiment, one or more cameras 200 may be provided in the vehicle 10 and capture images of, for example but not limited to, a dashboard, a driver seat, a passenger seat, a backseat, a trunk room, and a luggage space of the vehicle 10.

In the present example embodiment, the camera 200 may be configured to acquire image data to be used to determine whether any item such as baggage is left inside the vehicle compartment. In some embodiments, the camera 200 may be further configured to capture an image of a space around a lower portion of each seat or a space below each seat, for example.

In the present example embodiment, the camera 200 may output the image data thus acquired to the processing apparatus 100 which will be described later.

In the present example embodiment, the camera 200 may stop capturing an image of the inside of the vehicle compartment of the vehicle 10 when receiving an imaging stop request from the processing apparatus 100, for example (e.g., upon the power of the camera 200 being turned off).

In the present example embodiment, the notifier 300 may be, for example but not limited to, a speaker configured to output sounds to outside the vehicle compartment of the vehicle 10. The notifier 300 may output sound data received from the processing apparatus 100 which will be described later.

In the present example embodiment, the notifier 300 may output, for example but not limited to, a door lock sound when the occupant of the vehicle 10 locks a door of the vehicle 10.

In the present example embodiment, the notifier 300 may notify the occupant locking the door from outside the vehicle 10 of the presence of an item inadvertently left inside the vehicle compartment by outputting a sound.

The sound notifying the occupant of the vehicle 10 of the presence of an item inadvertently left inside the vehicle compartment will be described later.

Configuration Example of Processing Apparatus 100

The processing apparatus 100 may include one or more processors and one or more memories communicably coupled to the one or more processors.

Figure 2:
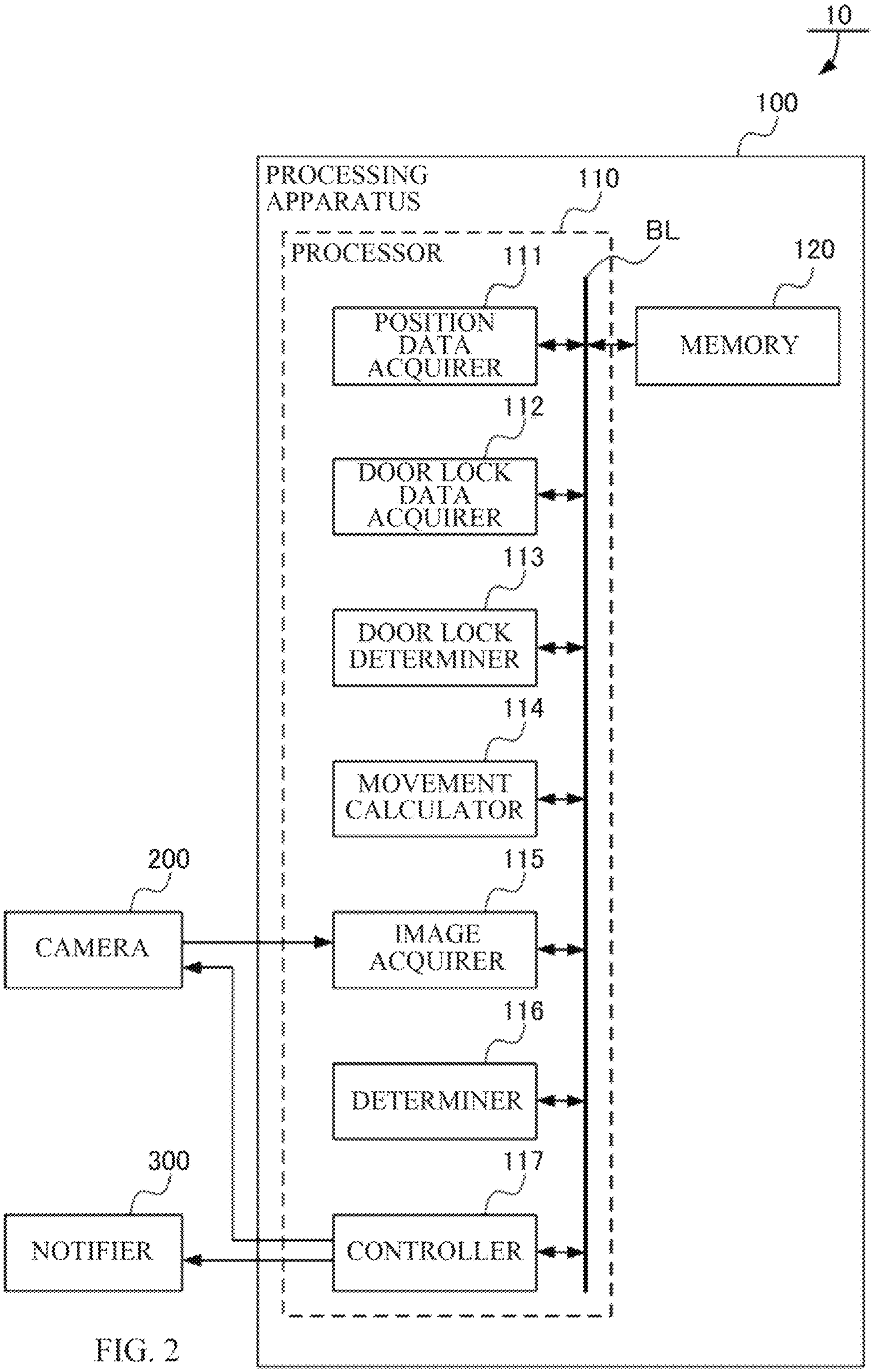
FIG. 2 is a block diagram illustrating a configuration example of a processing apparatus in the vehicle illustrated in FIG. 1.

As illustrated in FIG. 2, the processing apparatus 100 according to the present example embodiment may include a processor 110 and a memory 120.

Note that a configuration example of the processor 110 will be described later.

The memory 120 may include an unillustrated read only memory (ROM) or an unillustrated random-access memory (RAM).

The memory 120 may hold, for example but not limited to, a control program and various kinds of data received from the processor 110.

In the present example embodiment, the memory 120 may hold position data on a home position of the vehicle 10 in advance.

The position data on the home position may be, for example but not limited to, position data on a driver's home or position data on a parking space where the driver parks the vehicle 10 when coming home.

Configuration Example of Processor 110

As illustrated in FIG. 2, the processor 110 may include a position data acquirer 111, a door lock data acquirer 112, a door lock determiner 113, a movement calculator 114, an image acquirer 115, a determiner 116, and a controller 117. In one embodiment, the position data acquirer 111 may serve as a "first data acquirer". In one embodiment, the door lock data acquirer 112 may serve as a "second data acquirer". In one embodiment, the movement calculator 114 may serve as a "calculator".

These components in the processor 110 and the memory 120 may output and receive various kinds of information via a bus line BL.

The position data acquirer 111 is configured to acquire position data on a current location of the vehicle 10 by receiving electric waves emitted from a satellite positioning system.

In the present example embodiment, the position data acquirer 111 may acquire the position data of the vehicle 10, based on electric waves received from the global positioning system (GPS).

In the present example embodiment, the position data acquirer 111 may output the position data thus acquired to the door lock determiner 113, the movement calculator 114, and the controller 117 that will be described later, via the bus line BL.

The door lock data acquirer 112 is configured to acquire door lock data as to whether the door of the vehicle 10 is locked.

In the present example embodiment, the door lock data acquirer 112 may acquire the data indicating whether the door of the vehicle 10 is locked or unlocked, based on an output from an unillustrated switch that detects a locking state (a locked state or an unlocked state) of the door of the vehicle 10.

In the present example embodiment, the door lock data acquirer 112 may output the data on the locking state of the door thus acquired to the door lock determiner 113 and the controller 117 that will be described later, via the bus line BL.

In the present example embodiment, the door lock determiner 113 may determine whether the vehicle 10 is located at the home position and whether the door of the vehicle 10 is locked.

In the present example embodiment, the door lock determiner 113 may determine whether the vehicle 10 is located at the home position and whether the door of the vehicle is locked, based on the position data of the vehicle 10 received from the position data acquirer 111 and the data on the locking state of the door of the vehicle 10 received from the door lock data acquirer 112.

In the present example embodiment, the door lock determiner 113 may determine whether the vehicle 10 is located at the home position, based on the position data of the vehicle 10 received from the position data acquirer 111 and the position data on the home position held in the memory 120.

In the present example embodiment, the door lock determiner 113 may determine that the vehicle 10 is located at the home position when the vehicle 10 is located within a predetermined distance (e.g., less than or equal to 100 meters) from the location of the home position.

In the present example embodiment, the door lock determiner 113 may determine that the door of the vehicle 10 is locked when the locking state of the door received from the door lock data acquirer 112 has changed from the unlocked state to the locked state.

In the present example embodiment, when determining that the vehicle 10 is located at the home position and that the door of the vehicle 10 is locked, the door lock determiner 113 may output a result of the determination indicating that the vehicle 10 is located at the home position and that the door of the vehicle 10 is locked to the movement calculator 114 and the controller 117 that will be described later, via the bus line BL.

The movement calculator 114 is configured to calculate a movement of the vehicle 10 in a period from a departure from the home position to an arrival at the home position, based on the position data acquired by the position data acquirer 111.

In other words, the movement calculator 114 may calculate a traveling distance of the vehicle 10 in the period from the departure from the home position to the arrival at the home position.

In the present example embodiment, the movement calculator 114 may calculate the traveling distance of the vehicle 10 in a period from a reception of the result of determination indicating that the door of the vehicle 10 located at the home position is locked from the door lock determiner 113 to another reception of the result of determination indicating that the door of the vehicle 10 located at the home position is locked again from the door lock determiner 113.

In the present example embodiment, the movement calculator 114 may output a result of the calculation to the controller 117 that will be described later, via the bus line BL.

In the present example embodiment, the image acquirer 115 may acquire the image data on the image of the inside of the vehicle compartment captured by the camera 200 at a timing instructed by the controller 117 that will be described later.

In the present example embodiment, when receiving a first image acquiring request from the controller 117 that will be described later, for example, the image acquirer 115 may acquire the image data on the image of the inside of the vehicle compartment captured by the camera 200 as a first image, and store the data on the first image thus acquired in the memory 120 via the bus line BL.

In the present example embodiment, when receiving a second image acquiring request from the controller 117 that will be described later, the image acquirer 115 may acquire the image data on the image of the inside of the vehicle compartment captured by the camera 200 as a second image, and store the data on the second image thus acquired in the memory 120 via the bus line BL.

In some embodiments where a plurality of cameras 200 is provided in the vehicle 10, the image acquirer 115 may acquire the image data on the image of the inside of the vehicle compartment received from all the cameras 200 as the first image or the second image.

Note that the image acquirer 115 may acquire the first image and the second image at a timing described below.

In the present example embodiment, the determiner 116 may determine whether any item is inadvertently left inside the vehicle compartment, based on the first image and the second image that are held in the memory 120.

In the present example embodiment, the determiner 116 may determine whether any item is inadvertently left inside the vehicle compartment when receiving a determination request from the controller 117, which will be described later, via the bus line BL.

In the present example embodiment, the determiner 116 may determine whether any item is inadvertently left inside the vehicle compartment, by analyzing the first image and the second image and the difference between the first image and the second image.

In the present example embodiment, the determiner 116 may recognize an item placed inside the vehicle compartment by performing the image analysis of the first image and the second image.

In the present example embodiment, the determiner 116 may determine that an item is accidentally left inside the vehicle compartment when an object that is not detectable in the image analysis of the first image is included in objects recognized in the image analysis of the second image.

In some embodiments where a Kleenex box is detected as having been moved from the backseat to the passenger seat, the determiner 116 may determine that no item is inadvertently left inside the vehicle compartment because the Kleenex box is detectable in both the analysis of the first image and the analysis of the second image.

The method of determining an item inadvertently left inside the vehicle compartment is not limited to a particular method and may be any method that allows the determiner 116 to determine whether any item is inadvertently left inside the vehicle compartment, based on the first image and the second image.

In the present example embodiment, the determiner 116 may output the result of determination to the controller 117, which will be described later, via the bus line BL.

In the present example embodiment, the controller 117 may control an overall operation of the vehicle 10, based on the control program held in the memory 120.

When determining that the vehicle 10 is located at the home position and that the door of the vehicle 10 is locked, the controller 117 may cause the image acquirer 115 to acquire the first image.

In the present example embodiment, when acquiring, from the door lock determiner 113, the result of determination indicating that the door of the vehicle 10 located at the home position is locked, the controller 117 may output the imaging start request to the camera 200 and output the first image acquiring request to the image acquirer 115.

When determining that the vehicle 10 is located at the home position, that the door of the vehicle 10 is locked, and that the movement received from the movement calculator 114 is greater than a predetermined amount, the controller 117 may cause the image acquirer 115 to acquire the second image. In one embodiment, the predetermined amount may serve as a "predetermined threshold".

In the present example embodiment, when acquiring the result of determination indicating that the door of the vehicle 10 located at the home position is locked from the door lock determiner 113, the controller 117 may determine whether the movement received from the movement calculator 114 is greater than the predetermined amount.

In the present example embodiment, when receiving the result of determination indicating that the door of the vehicle 10 located at the home position is locked from the door lock determiner 113, and determining that the movement received from the movement calculator 114 is greater than the predetermined amount (e.g., 500 meters), the controller 117 may output the second image acquiring request to the image acquirer 115 and output the determination request to the determiner 116, via the bus line BL.

In the present example embodiment, when receiving the result of determination from the determiner 116, the controller 117 may output the imaging stop request to the camera 200.

When the determiner 116 determines that an item is inadvertently left inside the vehicle compartment, the controller 117 may notify the occupant of the vehicle 10 of the presence of the item inadvertently left inside the vehicle compartment.

In the present example embodiment, the controller 117 may change a door lock sound to be outputted from the notifier 300, based on the result of determination received from the determiner 116.

The door lock sound may be, for example but not limited to, an answer-back sound indicating that an operation to lock the door performed by the occupant has been received.

In the present example embodiment, when receiving the result of determination indicating that an item is inadvertently left inside the vehicle compartment from the determiner 116, the controller 117 may cause the notifier 300 to output a door lock sound 1 (e.g., a buzzer sound for three seconds).

In the present example embodiment, when receiving the result of determination indicating that no item is inadvertently left inside the vehicle compartment from the determiner 116, the controller 117 may cause the notifier 300 to output a door lock sound 2 (e.g., a buzzer sound for 0.3 seconds).

<Flow of Process to be Performed by Controller 117>

Figure 3:
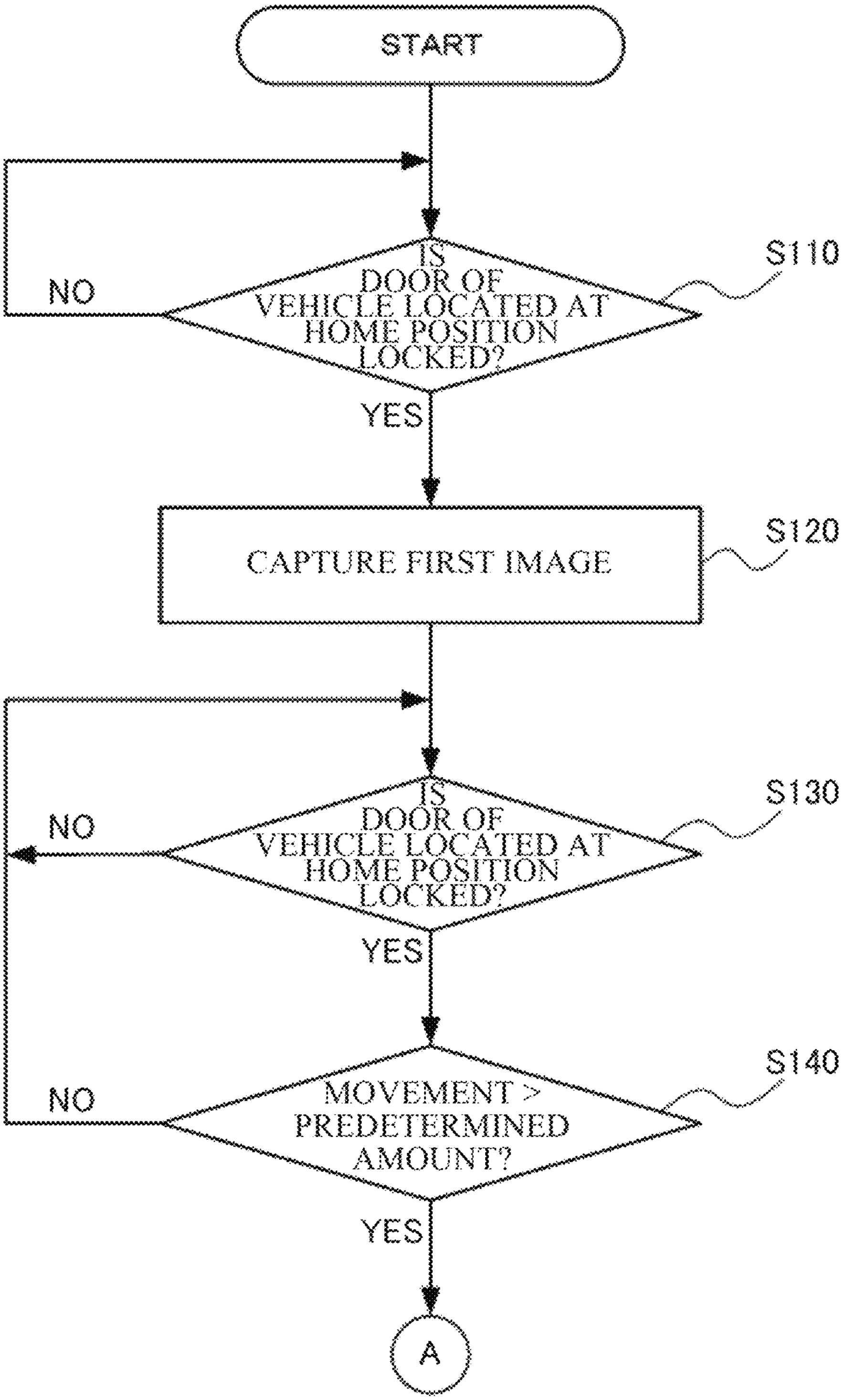
FIG. 3 is a flowchart of a process to be performed by the vehicle illustrated in FIG. 1.
Figure 4:
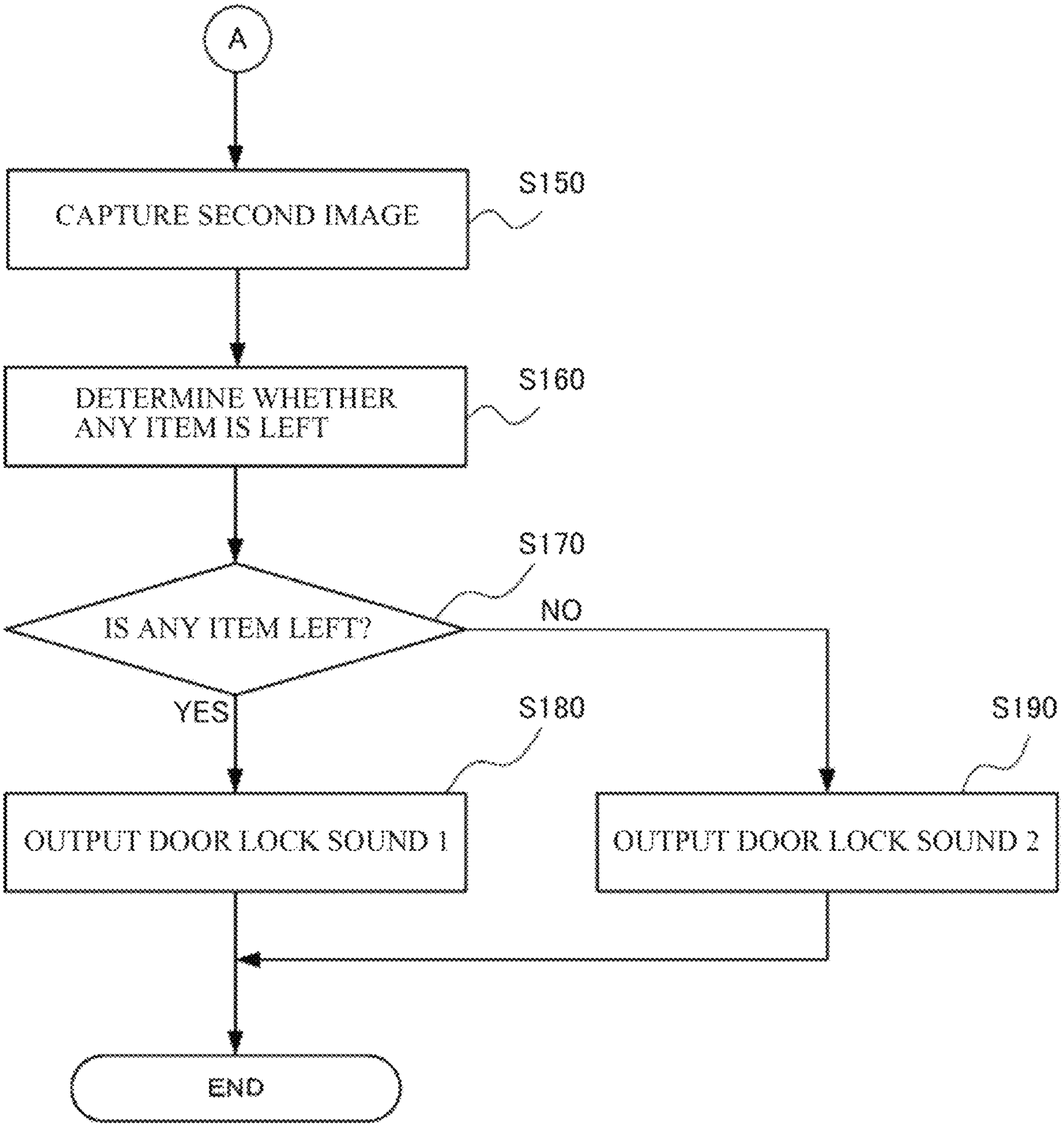
FIG. 4 is a flowchart of a process subsequent to the process illustrated in FIG. 3 to be performed by the vehicle illustrated in FIG. 1.

The flow of an exemplary process to be performed by the controller 117 will now be described with reference to FIGS. 3 and 4.

The controller 117 may determine whether the result of determination indicating that the door of the vehicle 10 located at the home position is locked has been received from the door lock determiner 113 (Step S110).

If determining that the result of determination indicating that the door of the vehicle 10 located at the home position is locked has not been received from the door lock determiner 113 (Step S110: NO), the controller 117 may return the process to a stand-by mode.

If determining that the result of determination indicating that the door of the vehicle 10 located at the home position is locked has been received from the door lock determiner 113 (Step S110: YES), the controller 117 may cause the process to proceed to Step S120.

If determining that the result of determination indicating that the door of the vehicle 10 located at the home position is locked has been received from the door lock determiner 113 (Step S110: YES), the controller 117 may cause the image acquirer 115 to acquire the first image (Step S120) and thereafter cause the process to proceed to Step S130.

The controller 117 may determine whether the result of determination indicating that the door of the vehicle 10 located at the home position is locked has been received from the door lock determiner 113 (Step S130).

If determining that the result of determination indicating that the door of the vehicle 10 located at the home position is locked has not been received from the door lock determiner 113 (Step S130: NO), the controller 117 may return the process to the stand-by mode.

If determining that the result of determination indicating that the door of the vehicle 10 located at the home position is locked has been received from the door lock determiner 113 (Step S130: YES), the controller 117 may cause the process to proceed to Step S140.

The controller 117 may determine whether the movement received from the movement calculator 114 is greater than the predetermined amount (e.g., 500 meters) (Step S140).

If determining that the movement received from the movement calculator 114 is not greater than the predetermined amount (Step S140: NO), the controller 117 may return the process to Step S130 and continue the process.

If determining that the movement received from the movement calculator 114 is greater than the predetermined amount (Step S140: YES), the controller 117 may cause the process to proceed to Step 150 illustrated in FIG. 4.

When determining that the movement received from the movement calculator 114 is greater than the predetermined amount (Step S140: YES), the controller 117 may cause the image acquirer 115 to acquire the second image (Step S150) and thereafter cause the process to proceed to Step S160.

The controller 117 may output the determination request to the determiner 116, to cause the determiner 116 to determine whether any item is inadvertently left inside the vehicle compartment, based on the first image captured in Step S120 and the second image captured in Step S150 (Step S160), and thereafter cause the process to proceed to Step S170.

The controller 117 may determine whether any item is inadvertently left inside the vehicle compartment, based on the result of determination received from the determiner 116 (Step S170).

If receiving the result of determination indicating that an item is inadvertently left inside the vehicle compartment from the determiner 116 (Step S170: YES), the controller 117 may cause the notifier 300 to output the door lock sound 1 (e.g., a buzzer sound for three seconds) (Step S180) and thereafter end the process.

If receiving the result of determination indicating that no item is inadvertently left inside the vehicle compartment from the determiner 116 (Step S170: NO), the controller 117 may cause the notifier 300 to output the door lock sound 2 (e.g., a buzzer sound for 0.3 seconds) (Step S190) and thereafter end the process.

<Workings and Effects>

As described above, the vehicle 10 according to the present example embodiment includes the camera 200, the position data acquirer 111, the door lock data acquirer 112, the movement calculator 114, the determiner 116, and the controller 117. The camera 200 is configured to capture an image of the inside of the vehicle compartment of the vehicle 10. The position data acquirer 111 is configured to acquire the position data of the vehicle 10 by receiving the electric waves emitted from the positioning satellite system. The door lock data acquirer 112 is configured to acquire the door lock data as to whether the door of the vehicle 10 is locked. The movement calculator 114 is configured to calculate the movement of the vehicle in the period from a departure from the home position to an arrival at the home position, based on the position data. The determiner 116 is configured to determine whether any item is inadvertently left inside the vehicle compartment, based on: the first image captured by the camera 200 in a situation where the vehicle 10 is determined to be located at the home position, based on the position data and where the door is determined to be locked, based on the door lock data; and the second image captured by the camera 200 in a situation where the vehicle 10 is determined to be located at the home position, based on the position data, where the door is determined to be locked, based on the door lock data, and where the movement is determined to be greater than the predetermined amount. The controller 117 is configured to, when the determiner 116 determines that an item is inadvertently left inside the vehicle compartment, notify the occupant of the vehicle 10 of notification information indicating that the item is inadvertently left inside the vehicle compartment.

When the vehicle 10 is located in a parking space near the home position and the door of the vehicle 10 is locked, the first image of the inside of the vehicle compartment of the vehicle 10 may be acquired.

When the vehicle 10 is located in the parking space near the home position and the door of the vehicle 10 is locked, confirmed is the movement in a period from previous parking of the vehicle 10 in the parking space near the home position to current parking of the vehicle 10 in the parking space near the home position. When the movement is greater than the predetermined amount, the second image of the inside of the vehicle compartment of the vehicle 10 may be acquired.

When the door of the vehicle 10 is repeatedly locked and unlocked to load baggage into the vehicle before the departure on a trip, the second image may be refrained from being acquired because the vehicle 10 is not traveling.

Accordingly, the vehicle 10 does not detect the baggage loaded in the vehicle 10 for the trip as an item inadvertently left inside the vehicle compartment.

When the door of the vehicle 10 is locked at a hotel that is a destination of the trip, the second image may be refrained from being acquired.

Accordingly, the vehicle does not detect the baggage loaded in the vehicle 10 for the trip as an item inadvertently left inside the vehicle compartment.

It is therefore possible for the vehicle 10 to determine whether any item is left inside the vehicle compartment with high accuracy.

In the present example embodiment, the vehicle 10 is configured to, when the determiner 116 determines that an item is inadvertently left inside the vehicle compartment, notify the occupant of the vehicle 10 of the notification information indicating that the item is inadvertently left inside the vehicle compartment.

This helps to prevent the occupant of the vehicle 10 from inadvertently leaving an item inside the vehicle compartment.

The controller 117 of the vehicle 10 according to the present example embodiment may notify the occupant of the vehicle 10 of the notification information indicating that the item is inadvertently left inside the vehicle compartment by changing the door lock sound, based on the result of determination by the determiner 116.

When receiving the result of determination indicating the presence of the item inadvertently left inside the vehicle compartment from the determiner 116, the controller 117 may cause the notifier 300 to output the door lock sound 1 (e.g., a buzzer sound for three seconds).

When receiving the result of determination indicating the absence of the item inadvertently left inside the vehicle compartment from the determiner 116, the controller 117 may cause the notifier 300 to output the door lock sound 2 (e.g., a buzzer sound for 0.3 seconds).

As described above, the vehicle 10 may cause the notifier 300 to output the buzzer sound for a relatively long time when an item inadvertently left inside the vehicle compartment is detected. This allows the occupant of the vehicle 10 to recognize the presence of the item inadvertently left inside the vehicle compartment.

The occupant of the vehicle 10 is therefore able to recognize whether an item is inadvertently left inside the vehicle compartment, based on the door lock sound. It is therefore possible to prevent an item from being inadvertently left inside the vehicle compartment.

Modification Example 1

In the example embodiments described above, when determining that an item is inadvertently left inside the vehicle compartment, the vehicle 10 may notify the occupant of the vehicle 10 of the presence of the item by outputting the door lock sound. However, in Modification Example 1, the vehicle may notify the occupant of the vehicle 10 of the presence of the item inadvertently left inside the vehicle compartment by displaying the notification information indicating that the item is inadvertently left inside the vehicle compartment on a smartphone owned by the occupant.

When determining that an item is inadvertently left inside the vehicle compartment, the vehicle 10 may send the notification information indicating that the item is inadvertently left inside the vehicle compartment and the second image of the item to the smartphone.

This allows the occupant of the vehicle 10 to know what item is left inside the vehicle compartment even after moving away from the vehicle 10.

In some embodiments, a program that causes the process to be performed by one or both of the determiner 116 and the controller 117 may be recorded on a non-transitory recording medium readable by a computer system. The vehicle 10 according to the example embodiment of the disclosure may be implemented by causing a memory of the computer system to load the program recorded in the non-transitory recording medium and causing the computer system to execute the program.

The computer system as used herein may encompass an operating system (OS) and hardware such as a peripheral device.

The "computer system" may encompass a website providing environment or a website displaying environment, when the computer system utilizes a World Wide Web (WWW) system.

The program may be transmitted from the computer system that contains the program in a device such as a storage device to another computer system via a transmission medium or by a carrier wave in a transmission medium.

The "transmission medium" designed to transmit the program may refer to a medium having a capability to transmit data, including: a network or a communication network such as the Internet; and a communication link or a communication line such as a telephone line.

The program may be directed to implement a part of the operation described above.

The program may be a so-called differential file or differential program designed to implement the operation by a combination of the program already recorded on the computer system.

Although some embodiments of the disclosure have been described in the foregoing by way of example with reference to the accompanying drawings, the disclosure is by no means limited to the embodiments described above. It should be appreciated that modifications and alterations may be made by the persons skilled in the art without departing from the scope as defined by the appended claims. The disclosure is intended to include such modifications and alterations in so far as they fall within the scope of the appended claims or the equivalents thereof.

It is understood that the persons skilled in the art can conceive of various modifications and variations within the scope of the disclosure and that these modifications and variations also fall within the scope of the disclosure.

For example, a modification to which some elements are added by the persons skilled in the art, a modification from which some elements are deleted by the persons skilled in the art, a modification the elements of which are changed in design by the persons skilled in the art, a modification to which some steps are added by the persons skilled, a modification from which some steps are deleted by the persons skilled in the art delete, and a modification the conditions of which are changed by the persons skilled in the art also fall within the scope of the disclosure as long as these modifications are in accordance with the gist of the disclosure.

Further, it should be understood that other effects apparently obtainable by the aspects of the disclosure described herein or other effects appropriately conceivable by the persons skilled in the art are provided by the disclosure.

Various other example embodiments are obtainable by appropriately combining the elements disclosed herein.

For example, some elements may be deleted from all the elements described in the example embodiments.

Further, the elements in different example embodiments may be combined as appropriate.

The limitations in the claims are to be interpreted broadly based on the language employed in the claims and not limited to examples described in this specification or during the prosecution of the application, and the examples are to be construed as non-exclusive.

As used in this specification and the appended claims, the singular forms "a", "an", and "the" include, especially in the context of the claims, are to be construed to cover both the singular and the plural, unless otherwise indicated herein or clearly contradicted by context.

Throughout this specification and the appended claims, unless the context requires otherwise, the terms "comprise", "include", "have", and their variations are to be construed to cover the inclusion of a stated element, integer, or step but not the exclusion of any other non-stated element, integer, or step.

The use of the terms first, second, etc. does not denote any order or importance, but rather the terms first, second, etc. are used to distinguish one element from another.

The terms "substantially", "approximately", "about", and their variants having a similar meaning thereto are defined as being largely but not necessarily wholly what is specified as understood by one of ordinary skill in the art.

The term "disposed on/provided on/formed on" and its variants having the similar meaning thereto as used herein refer to elements disposed directly in contact with each other or indirectly by having intervening structures therebetween.

According to at least one example embodiment of the disclosure, it is possible to determine whether any item is inadvertently left inside a vehicle compartment with high accuracy, and thereby prevent an item from being inadvertently left inside the vehicle compartment.

One or more of the position data acquirer 111, the door lock data acquirer 112, the movement calculator 114, the determiner 116, and the controller 117 illustrated in FIG. 2 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the position data acquirer 111, the door lock data acquirer 112, the movement calculator 114, the determiner 116 and the controller 17 illustrated in FIG. 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the position data acquirer 111, the door lock data acquirer 112, the movement calculator 114, the determiner 116, and the controller 117 illustrated in FIG. 2.

The invention claimed is:

1. A vehicle comprising:

a camera configured to capture an image of an inside of a vehicle compartment of the vehicle;

a first data acquirer configured to acquire position data of the vehicle by receiving electric waves emitted from a satellite positioning system;

a second data acquirer configured to acquire door lock data indicating whether a door of the vehicle is locked;

a calculator configured to calculate a traveling distance of the vehicle during a period that begins when the vehicle departs from a home position of the vehicle and ends when the vehicle returns to the home position, based on the position data;

a determiner configured to:

determine whether a first image-capturing condition is satisfied, the first image-capturing condition including that the vehicle is determined to be located at the home position based on the position data and that the door is determined to be locked based on the door lock data;

cause the camera to capture a first image when the first image-capturing condition is determined to be satisfied;

determine whether a second image-capturing condition is satisfied, the second image-capturing condition including that the vehicle is determined to be located at the home position based on the position data, that the door is determined to be locked based on the door lock data, and that the traveling distance is determined to be greater than a predetermined threshold;

cause the camera to capture a second image when the second image- capturing condition is determined to be satisfied; and make a determination as to whether any item is inadvertently left inside the vehicle compartment by comparing the first image and the second image; and a controller configured to, when the determiner determines that an item is inadvertently left inside the vehicle compartment, cause notification information indicating that the item is inadvertently left inside the vehicle compartment to be presented to an occupant of the vehicle;

wherein the controller is configured to cause the notification information indicating that the item is inadvertently left inside the vehicle compartment to be presented to the occupant of the vehicle, by changing a door lock sound to be outputted when the door is locked after the vehicle returns to the home position, based on a result of the determination made by the determiner.

2. The vehicle according to claim 1, wherein the traveling distance is calculated during a period from a first determination that the vehicle is located at the home position and the door is locked to a second determination that the vehicle is located at the home position and the door is locked again.

3. The vehicle according to claim 1, wherein the controller is configured to refrain from causing the camera to capture the second image when the vehicle is determined to be located at the home position, the door is determined to be locked, and the traveling distance is determined not to be greater than the predetermined threshold.

4. The vehicle according to claim 1, wherein the determiner is configured to recognize objects in the first image and the second image by image analysis, and determine that the item is inadvertently left inside the vehicle compartment when an object that is not recognized in the first image is recognized in the second image.

5. An item-left-behind prevention system configured to be applied to a vehicle, the item-left-behind prevention system comprising:

a camera configured to capture an image of an inside of a vehicle compartment of the vehicle; and a processing apparatus comprising:

one or more processors; and one or more memories communicably coupled to the one or more processors, wherein the one or more processors are configured to:

acquire position data of the vehicle by receiving electric waves emitted from a satellite positioning system;

acquire door lock data indicating whether a door of the vehicle is locked;

calculate a traveling distance of the vehicle during a period that begins when the vehicle departs from a home position of the vehicle and ends when the vehicle returns to the home position, based on the position data;

determine whether a first image-capturing condition is satisfied, the first image-capturing condition including that the vehicle is determined to be located at the home position based on the position data and that the door is determined to be locked based on the door lock data;

cause the camera to capture a first image when the first image-capturing condition is determined to be satisfied;

determine whether a second image-capturing condition is satisfied, the second image-capturing condition including that the vehicle is determined to be located at the home position based on the position data, that the door is determined to be locked based on the door lock data, and that the traveling distance is determined to be greater than a predetermined threshold;

cause the camera to capture a second image when the second image- capturing condition is determined to be satisfied;

determine whether any item is inadvertently left inside the vehicle compartment by comparing the first image and the second image; and when determining that an item is inadvertently left inside the vehicle compartment, cause notification information indicating that the item is inadvertently left inside the vehicle compartment to be presented to an occupant of the vehicle;

wherein the one or more processors are configured to cause the notification information indicating that the item is inadvertently left inside the vehicle compartment to be presented to the occupant of the vehicle, by changing a door lock sound to be outputted when the door is locked after the vehicle returns to the home position, based on a result of the determination.

6. The vehicle according to claim 5, wherein the traveling distance is calculated during a period from a first determination that the vehicle is located at the home position and the door is locked to a second determination that the vehicle is located at the home position and the door is locked again.

7. The vehicle according to claim 5, wherein the one or more processors are configured to refrain from causing the camera to capture the second image when the vehicle is determined to be located at the home position, the door is determined to be locked, and the traveling distance is determined not to be greater than the predetermined threshold.

8. The vehicle according to claim 5, wherein the one or more processors are configured to recognize objects in the first image and the second image by image analysis, and determine that the item is inadvertently left inside the vehicle compartment when an object that is not recognized in the first image is recognized in the second image.

9. A vehicle comprising:

a camera configured to capture an image of an inside of a vehicle compartment of the vehicle; and circuitry configured to:

acquire position data of the vehicle by receiving electric waves emitted from a satellite positioning system;

acquire door lock data indicating whether a door of the vehicle is locked;

calculate a traveling distance of the vehicle during a period that begins when the vehicle departs from a home position of the vehicle and ends when the vehicle returns to the home position, based on the position data;

determine whether a first image-capturing condition is satisfied, the first image-capturing condition including that the vehicle is determined to be located at the home position based on the position data and that the door is determined to be locked based on the door lock data;

cause the camera to capture a first image when the first image-capturing condition is determined to be satisfied;

determine whether a second image-capturing condition is satisfied, the second image-capturing condition including that the vehicle is determined to be located at the home position based on the position data, that the door is determined to be locked based on the door lock data, and that the traveling distance is determined to be greater than a predetermined threshold;

cause the camera to capture a second image when the second image-capturing condition is determined to be satisfied;

determine whether any item is inadvertently left inside the vehicle compartment by comparing the first image and the second image; and when determining that an item is inadvertently left inside the vehicle compartment, cause notification information indicating that the item is inadvertently left inside the vehicle compartment to be presented to an occupant of the vehicle;

wherein the circuitry is configured to cause the notification information indicating that the item is inadvertently left inside the vehicle compartment to be presented to the occupant of the vehicle, by changing a door lock sound to be outputted when the door is locked after the vehicle returns to the home position, based on a result of the determination.

10. The vehicle according to claim 9, wherein the traveling distance is calculated during a period from a first determination that the vehicle is located at the home position and the door is locked to a second determination that the vehicle is located at the home position and the door is locked again.

11. The vehicle according to claim 9, wherein the circuitry is configured to refrain from causing the camera to capture the second image when the vehicle is determined to be located at the home position, the door is determined to be locked, and the traveling distance is determined not to be greater than the predetermined threshold.

12. The vehicle according to claim 9, wherein the circuitry is configured to recognize objects in the first image and the second image by image analysis, and determine that the item is inadvertently left inside the vehicle compartment when an object that is not recognized in the first image is recognized in the second image.

* * * * *